United States Patent [19]
Kubala et al.

[11] Patent Number: 5,923,890
[45] Date of Patent: Jul. 13, 1999

[54] METHOD AND APPARATUS FOR OPTIMIZING THE HANDLING OF SYNCHRONOUS REQUESTS TO A COUPLING FACILITY IN A SYSPLEX CONFIGURATION

[75] Inventors: Jeffrey P. Kubala, Poughquag; Jeffrey M. Nick, Fishkill, both of N.Y.

[73] Assignee: International Business Machines Corporation, Armonk, N.Y.

[21] Appl. No.: 08/903,285

[22] Filed: Jul. 30, 1997

[51] Int. Cl.$^6$ ................................................. G06F 13/00
[52] U.S. Cl. .............................. 395/800.01; 395/800.13; 395/553; 395/566; 395/567
[58] Field of Search ..................... 395/800.01, 800.13, 395/566, 567, 841, 551, 553

[56] References Cited

U.S. PATENT DOCUMENTS

| | | | |
|---|---|---|---|
| 4,564,903 | 1/1986 | Guyette et al. | 711/201 |
| 4,843,541 | 6/1989 | Bean et al. | 395/856 |
| 5,329,619 | 7/1994 | Pagé et al. | |
| 5,410,655 | 4/1995 | Greenfield et al. | 395/825 |
| 5,561,809 | 10/1996 | Elko et al. | 395/200.43 |
| 5,564,040 | 10/1996 | Kubala | 711/173 |
| 5,574,945 | 11/1996 | Elko et al. | 395/825 |
| 5,694,342 | 12/1997 | Stein. | |

OTHER PUBLICATIONS

"Highly Parallel Coupling Facility Emulator/Router with Shadowed Link Buffers" Baskey et al., IBM Technical Disclosure Bulletin, vol. 39, No. 12, Dec. 1996, pp. 123–124.

"Enterprise Systems Architecture/390 Principles of Operation" IBM Publication SA22–7201–02, Dec. 1994.

"Processor Resource/Systems Manager Planning Guide" IBM Publication, GA22–7236–01, Jun. 1997.

*Primary Examiner*—Eric Coleman
*Assistant Examiner*—Mackly Monestime
*Attorney, Agent, or Firm*—William A. Kinnaman, Jr.; Cantor Colburn LLP

[57] ABSTRACT

A method and apparatus for optimizing the handling of a synchronous request issued from a system partition of a logically partitioned machine to a selected coupling facility. The coupling facility may be either an internal coupling facility residing in a separate logical partition or an external coupling facility residing on a separate physical machine; an internal coupling facility in turn runs on processors that are either dedicated to the coupling facility or shared with another logical partition. A logical partition manager maintains state information for each system partition indicating whether the partition is connected to an internal coupling facility. To ascertain the shared or non-shared status of a particular coupling facility to which it is connected, a system partition issues a Read Facility Parameters (RFP) command to the target facility, which responds with a message response block (MRB) containing a bit that is 1 if it uses dedicated processors and 0 if it uses shared processors. The system partition stores this information in an entry for the coupling facility kept in a shared/dedicated attribute table maintained by the partition. Each time the system partition issues a subsequent request to a coupling facility, it sets a bit in a message operation block (MOB) of the request to indicate the shared status of the facility, as indicated by the corresponding entry in its shared/dedicated attribute table. The processor executing the request examines the MOB bit as well as the state information maintained by the logical partition manager for the partition. A synchronous request to a coupling facility is converted to an asynchronous request if (1) the state information maintained by the logical partition manager indicates that the originating system partition is connected to an internal coupling facility and (2) the MOB bit indicates that the target coupling facility uses shared processors. Otherwise, a synchronous request is issued to the target facility without being converted to an asynchronous request.

11 Claims, 3 Drawing Sheets

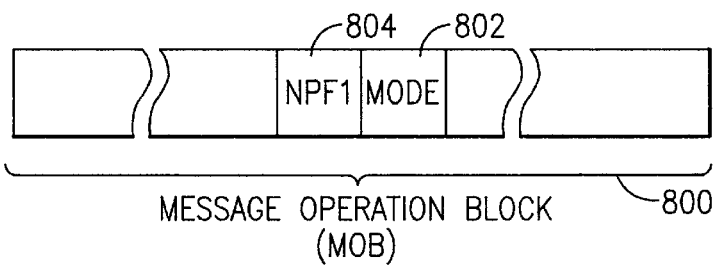
FIG.7
FIG.8
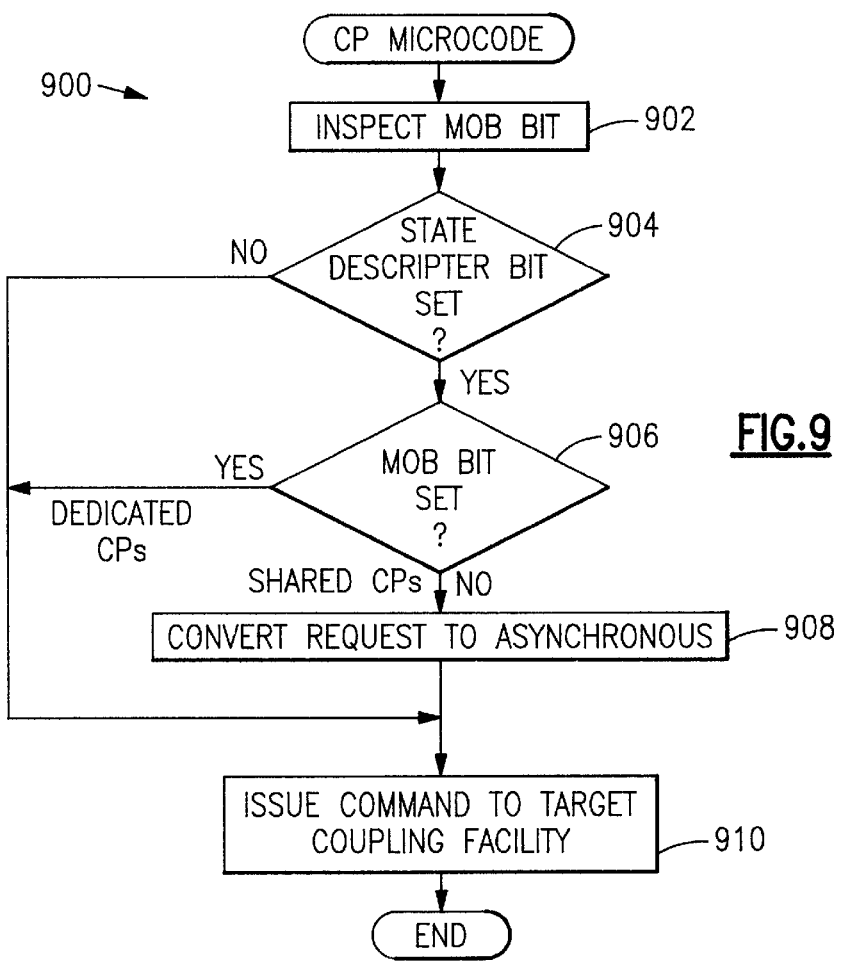
FIG.9

METHOD AND APPARATUS FOR OPTIMIZING THE HANDLING OF SYNCHRONOUS REQUESTS TO A COUPLING FACILITY IN A SYSPLEX CONFIGURATION

BACKGROUND OF THE INVENTION

1. Field of the Invention

This invention relates to a method and apparatus for optimizing the handling of a synchronous request issued from a requester to a request handler and, more particularly, to a method and apparatus for optimizing the handling of a synchronous request issued from a system partition of a logically partitioned machine in a sysplex configuration.

2. Description of the Related Art

Many computer hardware machines conforming to the IBM® S/390® architecture, as described, for example, in the IBM publication *Enterprise Systems Architecture/390 Principles of Operation*, SA22-7201-02, Dec. 1994, incorporated herein by reference, operate in what is known as logically partitioned (LPAR) mode. Logically partitioned computer systems are well known in the art and are described in Guyette et al. U.S. Pat. No. 4,564,903, Bean et al. U.S. Pat. No. 4,843,541, and Kubala U.S. Pat. No. 5,564,040, incorporated herein by reference. Commercial embodiments of logically partitioned systems include IBM S/390 processors with the Processor Resource/Systems Manager™ (PR/SM™) feature and described, for example, in the IBM publication *Processor Resource/Systems Manager Planning Guide*, GA22-7236-01, June 1997, incorporated herein by reference.

Logical partitioning allows the establishment of a plurality of system images within a single physical machine, or central processor complex (CPC). Each system image is capable of operating as if it were a separate computer system. That is, each logical partition can be independently reset, initially loaded with an operating system that may be different for each logical partition, and operate with different software programs using different input/output (I/O) devices. Logical partitioning is in common use today because it provides its users with flexibility to change the number of logical partitions in use and the amount of physical system resources assigned to each partition, in some cases while the entire central processor complex continues to operate.

A recent addition to the IBM S/390 architecture, usually operating in a logically partitioned environment, is the IBM Parallel Sysplex™ configuration, comprising two or more systems interconnected via a coupling facility to form what is known as a "sysplex" (for "system complex"). A sysplex configuration may have more than one coupling facility, for example a backup coupling facility set to take over if a primary coupling facility fails. Each system that is a member of a sysplex may be either a separate hardware machine or a separate logical partition of a particular hardware machine. In a similar manner, each coupling facility in the sysplex may be either a separate hardware machine or a separate logical partition of a particular hardware machine.

In the S/390 Parallel Sysplex architecture, a system issues a request to a coupling facility using a Send Message (SMSG) instruction. This instruction is executed by a central processor (CP) of the machine on which the system resides; this CP may be a logical CP if the system resides in a logical partition. The executing CP causes a message command block (MCB) to be sent along a message path to the coupling facility and receives back a message response block (MRB) containing the results of the request. Message communication and other aspects of the operation of an S/390 coupling facility are described in such references as Elko et al. U.S. Pat. No. 5,561,809, Elko et al. application Ser. No. 08/147,697, filed Nov. 4, 1993, and the patents and applications referred to therein, all incorporated herein by reference.

SMSG instructions may be executed either synchronously or asynchronously. When executed asynchronously, the SMSG instruction is competed as soon as the request in the form of a MCB is sent off to the target coupling facility. When executed synchronously, on the other hand, the SMSG instruction is not completed until a response in the form of an MRB is received back from the target facility.

There are many situations where it is advantageous for a SMSG instruction to be executed synchronously. This presents a problem, however, if both the system and the coupling facility receiving the request reside on different logical partitions on the same physical machine with shared CPs. As noted above, a synchronous SMSG instruction is not completed until the executing CP has received a response back from the target coupling facility; until the command is completed, the executing CP is not free to do other work. However, if the coupling facility needs the same physical CP to execute the request at its end, a deadlock will result since the CP is being held by the requesting system.

Currently, to avoid this problem, if a system that is a member of a Parallel Sysplex configuration is running in a logical partition that uses shared CPs and there is a coupling facility (CF) partition on that same machine that also uses shared CPs, all coupling facility (SMSG) requests from that logical partition ("system partition" hereinafter) are converted to asynchronous requests; there is no determination of whether the system partition is even connected to an inboard shared-CP coupling facility, much less whether it is issuing a request to that facility. Even if this determination is made, the mechanism used to accomplish this, known as the synchronous override Start Interpretive Execution (SIE) state descriptor control, is all or nothing for a particular system partition: if the partition accesses both an inboard and an outboard CF, all requests are converted to asynchronous requests to accommodate the inboard CF.

FIG. 1 shows the current environment, in which a system partition MVS_A accesses both an outboard coupling facility CF_A with dedicated processors and an inboard coupling facility CF_B. Both the system partition MVS_A and the inboard coupling facility CF_B are running with shared CPs. All requests from MVS_A to either CF are converted to asynchronous requests to avoid the deadlock problem, regardless of the identity of the target facility.

While this mode of operation avoids deadlocks, it can lead to situations where synchronous SMSG requests to an external or otherwise dedicated coupling facility are being needlessly being converted into asynchronous requests. This results in a performance hit to these converted commands as well as driving up system assist processor (SAP) utilization to handle all the requests as asynchronous.

Shared CPs have been used relatively infrequently for coupling facilities up until now, so the exposure so far has been rather limited. However, with recent advances in coupling facility technology, shared CPs for a coupling facility have become an attractive option, especially for a hot-standby CF. These configurations will very naturally have a hot standby CF using shared CPs on the same physical machine as one or more system partitions that are sysplex members. These system partitions will also be attached to the primary external CF. It is important that a high level of performance be maintained in this environment. What is desired is a mechanism for allowing requests that can go synchronous (to the external CF) stay synchronous and only cause requests from an internal shared system CP to a shared CF CP be converted to asynchronous.

Currently, on an S/390 processor in logically partitioned mode, the logical partition manager or hypervisor (LPAR in FIG. 1) monitors changes in the current active configuration of a single CPC during activation and deactivation of coupling facility logical partitions. If a CF with real links and shared CPs is activated, a mark is put on the wall to set all system partitions with shared CPs to convert synchronous SMSG requests to asynchronous requests unconditionally. This is done by setting a single bit in the SIE state descriptors for the system partitions, which CP microcode checks for all SMSG requests from the partition. This conversion is done to avoid the problems of trying to complete a synchronous SMSG request that needs the same CP to dispatch the CF on to complete the request.

Actual monitoring of the connectivity of the links attached from a given system partition would be a rather involved task for a logical partition manager to undertake, especially when considering all the dynamic aspects of the configuration, including channel path reconfiguration and dynamic I/O.

SUMMARY OF THE INVENTION

The S/390 coupling facility architecture has an existing command, known as the Read Facility Parameters (RFP) command, for obtaining parameter information from a target coupling facility. If the results of this RFP command are augmented to contain an indication of whether or not the CF is using shared CPs, this information can be utilized to make optimal decisions about synchronous versus asynchronous SMSG requests. A new bit in the message operation block (MOB) for each SMSG request can be set by the originating system to communicate this information to the CP to determine if the CP should convert synchronous SMSG requests to asynchronous requests.

Using this approach, the configuration in FIG. 1 can now be operationally changed to have the synchronous requests from system MVS_A to coupling facility CF_A remain as synchronous requests rather than converting them all to asynchronous. All the requests from MVS_A to CF_B would continue to be converted to asynchronous, since CF_B is using shared CPs.

The present invention can easily be extended should there ever be an interdependency introduced between coupling facilities. The table of known coupling facilities would have to understand all the interdependencies to form a composite shared versus dedicated CP picture of the CFs.

In general, the present invention contemplates a method and apparatus for optimizing the handling of a synchronous request from a request handler in an information handling system in which a requester issues a request to a request handler executing on a processor resource that is either dedicated to the request handler or shared with another resource user. In accordance with the invention, a determination is made whether the request handler is executing on a processor resource that is shared with another resource user. (Where the processor resource in question comprises multiple processors, the determination is whether any one of the processors is dedicated to the request handler.) If the request handler is executing on a processor resource that is dedicated to the request handler, a synchronous request generated by the requester is issued as a synchronous request to the request handler. On the other hand, if the request handler is executing on a processor resource that is shared with another resource user, the request is converted to an asynchronous request before issuing it to the request handler.

The requester may reside in one logical partition of a plurality of logical partitions into which a single physical machine is divided, while the request handler may reside in a another logical partition on the same machine or on another physical machine. In such a configuration the request may be converted to an asynchronous request only if it is determined that the requester is coupled to a request handler residing in one of the logical partitions.

The requester may determine whether the request handler is executing on a processor that is shared with another resource user by transmitting a request to the request handler for a shared status indicator indicating whether the request handler is dedicated to the request handler or shared with another resource user and storing the shared status indicator as descriptor data for the request handler when it is received from the request handler.

In a parallel sysplex configuration, the present invention may be implemented as follows:

1. A bit is added to the results (the message response block or MRB) of a Read Facility Parameters (RFP) command that is returned from the CF to a system when the system is ascertaining parameters for a particular CF. This new bit is '1' if the CF uses dedicated CPs, '0' if it does not. '1' is chosen for dedicated so that machines that do not have this change will appear as shared in the topology and will err towards being safe to continue functioning.
2. Each system maintains a table of CF identity that includes the new shared/dedicated indicator that can be used to determine if a given coupling facility it is using can use synchronous requests or not.
3. An originating system sets a new bit in the MOB of each SMSG request. This bit is '1' if the target CF is dedicated, '0' if shared. Once again, functional compatibility is maintained with the bit setting in this fashion.
4. The logical partition manager ("LPAR") continues its monitoring of CFs using shared CPs as it does currently. The state descriptor indicator is still set to convert synchronous requests to asynchronous only if the system uses shared CPs and there is a CF on the same physical machine (i.e., CPC) with shared CPs.
5. CP microcode inspects the new bit in the MOB. The new MOB bit only has meaning when running under SIE (in a partition) with the LPAR-maintained asynchronous conversion indicator set. If the state descriptor bit is set and the MOB bit is not, the request is converted to asynchronous. If both the state descriptor bit and the MOB bits are set, the request remains synchronous. In essence, the MOB bit allows the asynchronous conversions to be cancelled.

BRIEF DESCRIPTION OF THE DRAWINGS

FIG. 7 shows the shared/dedicated attribute data maintained by each system partition.

FIG. 8 the format of a message operation block (MOB).

FIG. 9 shows the procedure followed by a central processor when executing a synchronous SMSG instruction

DESCRIPTION OF THE PREFERRED EMBODIMENT

Figure 1:
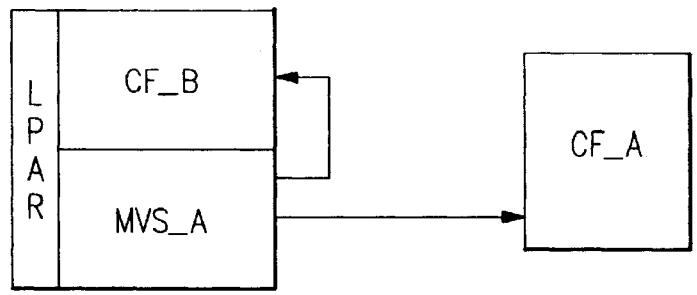
FIG. 1 shows the current sysplex environment to which the present invention is directed.
Figure 2:
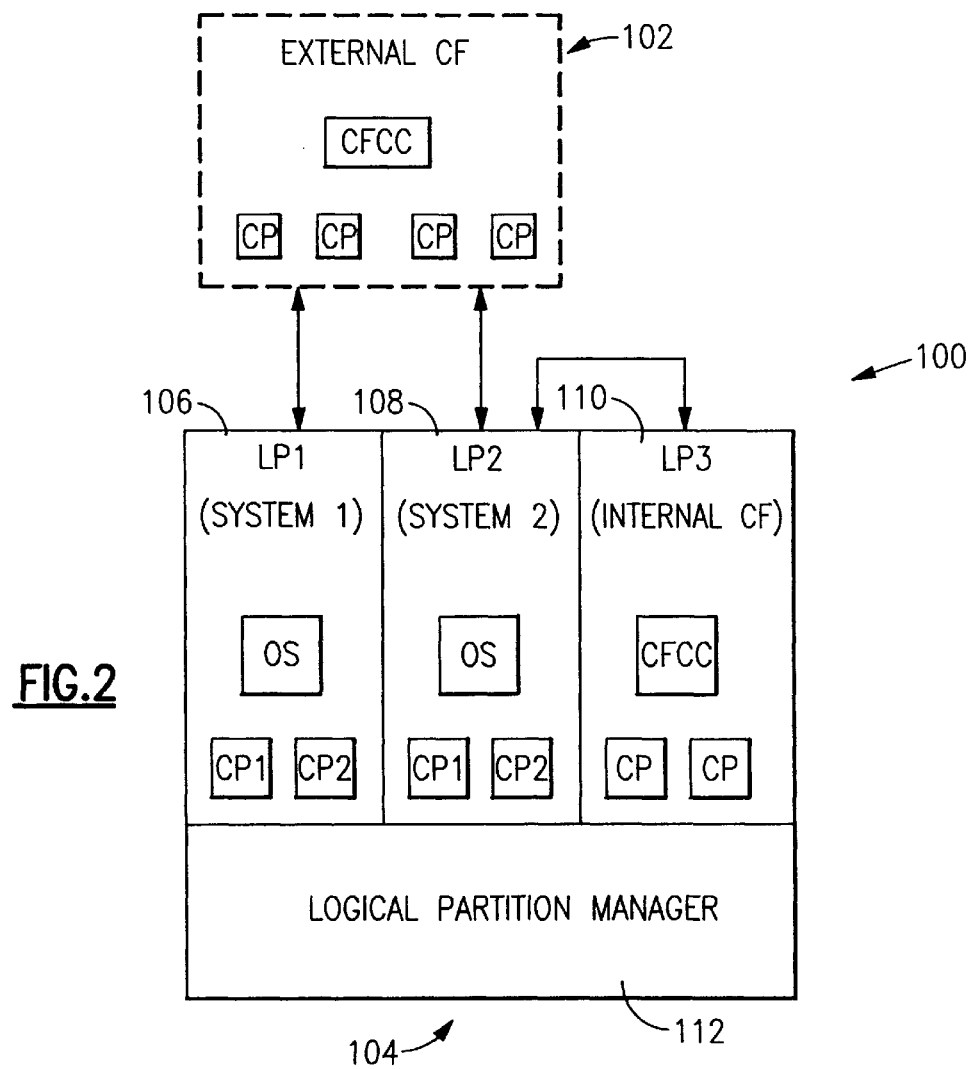
FIG. 2 shows a sysplex configuration incorporating the present invention.

Referring to FIG. 2, an exemplary computer system complex 100 incorporating the present invention comprises an external coupling facility (CF) 102 to which one or more central processor complexes (CPCs) or host systems 104 (one of which is shown) are attached.

Each central processor complex 104 is divided into a plurality of logical partitions (LPs) LP1–LP3, an exemplary three of which 106, 108, 110 are shown, which are managed by a logical partition manager 112. Logical partition manager 112 and logical partitions 106–110 (LP1–LP3) each comprise one or more programs residing in respective portions of central storage (not separately shown).

As noted above, from the standpoint of the resident programs, each of logical partitions 106–110 (LP1–LP3) effectively functions as a separate hardware machine. Each of logical partitions 106 and 108 (LP1–LP2) has its own operating system OS, which may differ for each logical partition, as well as one or more application programs (not shown), and is regarded as a separate system for the purpose of this specification; partitions such as partitions LP1 and LP2 with operating systems and application programs resident therein are referred to herein as system partitions. Suitable such operating systems OS in an S/390 environment include the IBM programs OS/390™, MVS/ESA™, VM/ESA™, VSE/ESA™ and Transaction Processing Facility (TPF). Logical partitioning in an S/390 environment is discussed further in the references cited above.

Partition 110 (LP3), on the other hand, contains coupling facility control code (CFCC) that implements coupling facility functions. It thus constitutes an additional internal or inboard coupling facility, which may serve as either a primary coupling facility or as a backup to external coupling facility 102. Partitions such as partition 110 (LP3) with coupling facility control code rather than an operating system are referred to herein as coupling facility (CF) partitions to distinguish them from system partitions 106 and 108 (LP1–LP2).

Each of logical partitions 106–110 has one or more logical central processors CP, each of which represents all or a share of a physical central processor of the central processor complex 104 allocated to that logical partition.

In a manner similar to internal coupling facility 110, external coupling facility 102 contains coupling facility control code CFCC executing on one or more central processors CP to implement coupling facility functions. In contrast to the logical CPs of internal coupling facility 110, which may be either dedicated or shared with another partition, the (physical) CPs of external coupling facility 102 are always dedicated.

Figure 3:
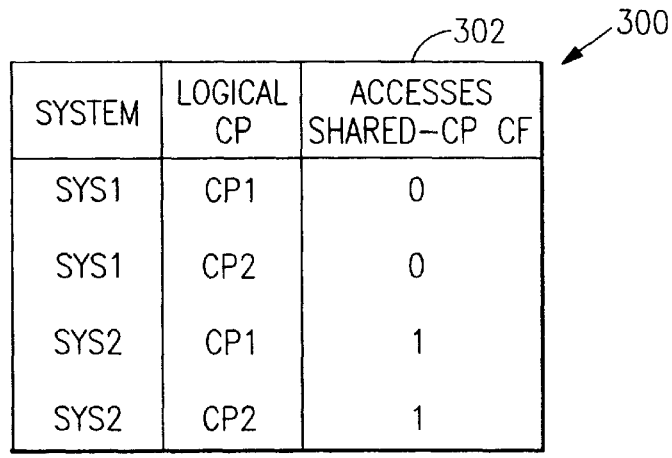
FIG. 3 shows the state descriptor information maintained by the logical partition manager.

Referring to FIG. 3, logical partition manager 112 stores for each logical CP of system partitions 106 and 108, along with other state descriptor information (not shown), a bit indicating whether the particular system is connected to an internal coupling facility 110 with shared CPs. This bit 302 is used by the executing CP in a manner to be described below to determine whether to handle an SMSG instruction synchronously or asynchronously.

Figure 4:
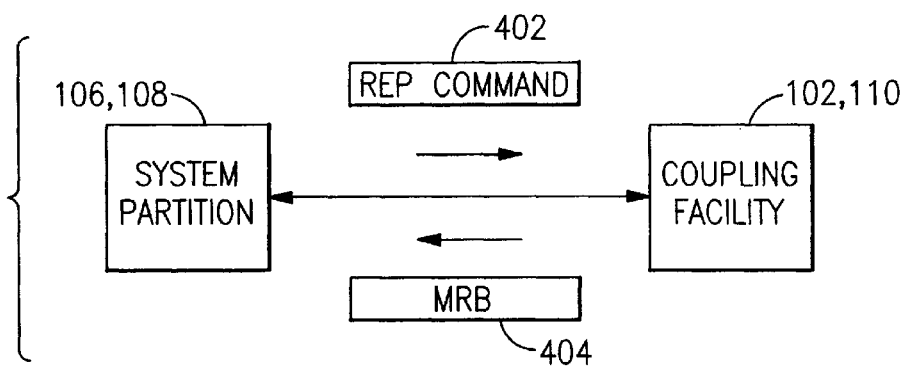
FIG. 4 shows the message blocks exchanged by a system and a coupling facility.

FIG. 4 shows the procedure by which a system partition 106 or 108 obtains information on the shared or nonshared status of a particular coupling facility 102 or 110. To get this information, the system partition sends a message command block (MCB) for a Read Facility Parameters (RFP) command 402 to the coupling facility, using conventional messaging functions forming no part of the present invention. In response, the coupling facility returns a message response block (MRB) 404 to the system partition.

Figure 5:
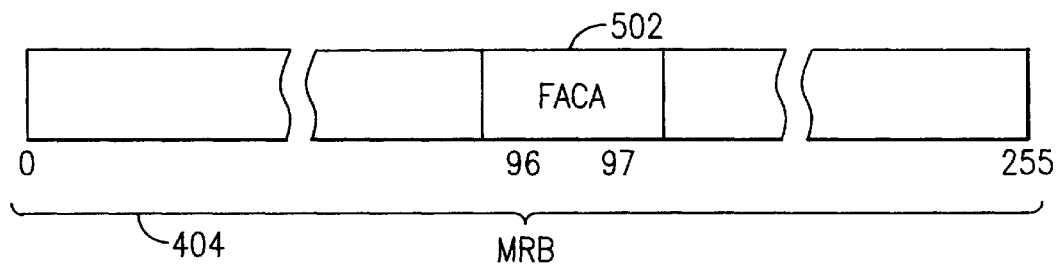
FIG. 5 shows a message response block (MRB).
Figure 6:
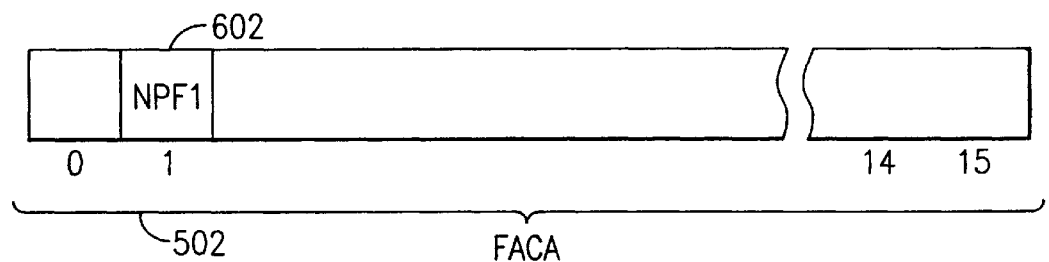
FIG. 6 shows the facility attributes (FACA) field of a message response block.

Referring now to FIG. 5, in the disclosed embodiment MRB 404 consists of a 256-byte string (bytes 0–255), bytes 96–97 of which constitute a 16-bit facility attributes (FACA) field 502 (bits 0–15). Referring to FIG. 6, bit 1 of the facility attributes field constitutes a one-bit non-preemptable facility indicator (NPFI) 602. The NPFI 602 specifies the preemptable status of the coupling facility 102 or 110 returning the MRB 404. Thus, an NPFI 602 of 0 indicates that all central processors (CPs) used by the coupling facility are shared with another user and hence preemptable, while an NPFI of 1 indicates that one or more central processors (CPs) used by the coupling facility are dedicated to that facility and hence non-preemptable. The data formats shown in FIGS. 5 and 6 are exemplary only; other formats may be used as alternatives.

Referring to FIG. 7, the system partition 106 or 108 originating the RFP command 402 extracts the NPFI 602 (along with other CF parameters not relevant to the present invention) from the returned MRB 404 and places it in a shared/dedicated attribute table 700 that it maintains for the coupling facilities that it is connected to. As shown in the figure, each entry 702 in the descriptor table 700 corresponds to a particular coupling facility (CF1, CF2, etc.) and contains (along with other CF parameters not shown) the NPFI 602 obtained by using the RFP command 402.

Referring to FIG. 8, whenever a system partition 106 or 108 that has issued an RFP command 402 to a coupling facility 102 or 110 formulates a subsequent command to that facility, it creates a message operation block (MOB) 800 containing, among other command data (as described in the Elko references cited above), two bits that are pertinent to the present invention.

A mode bit 802 indicates whether, from the standpoint of the system partition 106 or 108, and other conditions permitting, the SMSG instruction should be executed synchronously or asynchronously; this mode bit is the same as the A (asynchronous) MOB bit described in the Elko et al. patent referred to above. In the embodiment shown, a mode bit 802 of 0 indicates synchronous execution, while a mode 802 bit of 1 indicates asynchronous execution, although the choice is arbitrary. An SMSG instruction having a mode bit 802 of 1 is always executed asynchronously, and its processing is not changed by the present invention. On the other hand, an SMSG instruction having a mode bit 802 of 0 is executed synchronously only by default, and may end up being converted to an asynchronous instruction, depending on (1) the location of the coupling facilities 102 and 110 to which the system partition is attached, and (2) the shared status of the CPs on which the target facility is executing.

An NPFI bit 804 (which need not be contiguous to mode bit 802) is a copy of the NPFI bit 602 received from the coupling facility 102 or 110 and stored in the descriptor table 700. As described below, the NPFI bit 804, depending on its value, overrides the conversion decision as indicated by the state descriptor bit 302.

FIG. 9 shows the procedure 900 followed by a logical CP executing a synchronous SMSG instruction (as indicated by a mode bit 802 of 0 in the MOB 800. Typically, the steps shown would be implemented by microcode. Upon encountering a synchronous SMSG instruction, the logical CP examines the NPFI bit 804 in the MOB 800, as well as the state descriptor bit 302 maintained by the logical partition manager 112 for that logical CP (step 902). If the state descriptor bit 302 is set, indicating that the originating partition is connected to an internal coupling facility 110 (step 904), and the NPFI bit 804 in message operation block 800 is not set, indicating that the target coupling facility uses shared processors (step 906), then the synchronous instruction is converted to an asynchronous instruction (step 908) before issuing a message command block (MCB) is issued to the coupling facility (step 910). (Steps 904 and 096 may be reversed if desired.) On the other hand, if either the state descriptor bit 302 is not set (step 904) or the bit 804 in message operation block 800 is set (step 906), then the command is issued to the target coupling facility without being converted to an asynchronous command (step 910).

The present invention improves the performance of a sysplex configuration by reducing the overhead incurred from back-end processing of asynchronous requests and by reducing the need to send requests asynchronously. Prior approaches, by contrast, had no sysplex-wide topology view used to optimally control this conversion. A limited-scope, all-or-nothing approach on a single-CPC basis was used.

The invention is preferably implemented as software or microcode (i.e., a machine-readable program of instructions tangibly embodied on a program storage devices) executing on one or more hardware machines. While a particular embodiment has been shown and described, various modifications will be apparent to those skilled in the art. Thus, while the invention has been described in the environment of an S/390 sysplex configuration, the invention has general application to situations where a requester issues a synchronous request to a request handler executing on a processor resource that that is either dedicated to the request handler or shared with another resource user.

What is claimed is:

1. In an information handling system in which a requester issues a request to a request handler, said request handler executing on a processor resource that is either dedicated to said request handler or shared with another resource user, a method of handling a synchronous request to said request handler, comprising the steps of:
   determining whether said request handler is executing on a processor resource that is shared with another resource user;
   generating a synchronous request from said requester to said request handler;
   if said request handler is executing on a processor resource that is dedicated to said request handler, issuing said request as a synchronous request to said request handler; and
   if said request handler is executing on a processor resource that is shared with another resource user, converting said request to an asynchronous request before issuing said request to said request handler.

2. The method of claim 1 in which said requester resides in one logical partition of a plurality of logical partitions into which a single physical machine is divided, each of said logical partitions functioning as a logical machine having access to specified resources of said physical machine.

3. The method of claim 2, comprising the further step of determining whether said requester is coupled to a request handler residing in one of said logical partitions, said request being converted to an asynchronous request only if said requester is coupled to a request handler residing in one of said logical partitions.

4. The method of claim 2 in which said request handler resides in a another logical partition of said plurality of logical partitions.

5. The method of claim 4 in which said physical machine is a first physical machine, said request handler residing in a second physical machine separate from said first physical machine.

6. The method of claim 5 in which said requester is coupled to a plurality of request handlers, at least one of said request handlers residing in said second physical machine and at least one of said request handlers residing in a logical partition of said first physical machine.

7. The method of claim 1 in which said step of determining whether said request handler is executing on a processor that is shared with another resource user is performed by said requester and comprises the steps of:
   transmitting a request to said request handler for a shared status indicator indicating whether said request handler is dedicated to said request handler or shared with another resource user;
   receiving said shared status indicator from said request handler; and
   storing said shared status indicator as descriptor data for said request handler.

8. A program storage device readable by a machine, tangibly embodying a program of instructions executable by the machine to perform method steps of claim 1.

9. In an information handling system in which a requester issues a request to a request handler, said request handler executing on a processor resource that is either dedicated to said request handler or shared with another resource user, apparatus for the handling of a synchronous request to said request handler, comprising:
   means for determining whether said request handler is executing on a processor that is shared with another resource user;
   means for generating a synchronous request from said requester to said request handler;
   means for issuing said request as a synchronous request to said request handler if said request handler is executing on a processor resource that is dedicated to said request handler; and
   means for converting said request to an asynchronous request before issuing said request to said request handler if said request handler is executing on a processor resource that is shared with another resource user.

10. The apparatus of claim 9 in which said requester resides in one logical partition of a plurality of logical partitions into which a single physical machine is divided, each of said logical partitions functioning as a logical machine having access to specified resources of said physical machine, said apparatus further comprising:
   means for determining whether said requester is coupled to a request handler residing in one of said logical partitions, said request being converted to an asynchronous request only if said requester is coupled to a request handler residing in one of said logical partitions.

11. The apparatus of claim 9 in which said means for determining whether said request handler is executing on a processor that is shared with another resource user is associated with said requester and comprises:

means for transmitting a request to said request handler for a shared status indicator indicating whether said request handler is dedicated to said request handler or shared with another resource user;

means for receiving said shared status indicator from said request handler; and means for storing said shared status indicator as descriptor data for said request handler.

* * * * *